UNITED STATES PATENT OFFICE.

JOSEPH VERITY, OF STRETFORD, ENGLAND, ASSIGNOR TO CARLO FRUA DE ANGELI, OF MILAN, ITALY.

MANUFACTURE OF DEXTRIN.

1,016,803. Specification of Letters Patent. Patented Feb. 6, 1912.

No Drawing. Application filed July 12, 1911. Serial No. 638,423.

*To all whom it may concern:*

Be it known that I, JOSEPH VERITY, a British subject, residing at Stretford, county of Lancaster, England, have invented certain new and useful Improvements in the Manufacture of Dextrin, of which the following is a specification.

This invention relates to certain improvements in the manufacture of dextrin from farinaceous substances.

Dextrin is at present made from corn starch, farina, tapioca, and other farinaceous substances to which acid has been added by heating same on open trays at a temperature of say 350° F. to 400° F. and the process occupies a considerable time varying from a week to a fortnight. It has also been proposed to obtain dextrin from rice or other grain by heating the same together with water and hydrochloric acid under considerable pressure.

This invention consists essentially in the use of narrow or flat closed or sealed vessels through which the heat can readily penetrate evenly throughout the material without agitation or stirring such vessels being immersed in water or steam in tanks at or above boiling point.

In carrying out the invention I take the starch, farina, tapioca, or other farinaceous material prepared or dressed with acid in the usual way and place the same in narrow or shallow vessels which are closed and sealed. These vessels are immersed in a tank of boiling water or other liquid or steam and maintained at a temperature therein of from 212° F. to 250° F. (or even up to 400° F. or 500° F.) for from 6 to 12 hours. The narrow vessel enables the heat to penetrate equally and evenly throughout the material. The length of time will vary according to the temperature at which the operation is carried out and the quantity of acid added to the material—the higher the temperature and the greater the quantity of acid the shorter the time in which the conversion into dextrin will occupy. I do not propose to add a greater quantity of acid than is now customary. The vessels to receive or contain the material are narrow or shallow say about 6 inches from wall to wall to permit the heat to get at the sides, and penetrate evenly through the material and are closed to prevent water entering. A series of such flat vessels may be used. The vessels are approximately of a size of 3' 8" x 3' 8" x 6 inches which enables them to be easily and economically handled. The lids are bolted on to the vessels with a suitable air tight joint.

What I claim as my invention and desire to protect by Letters Patent is:—

1. The process of converting farinaceous substances into dextrin which consists in subjecting the material to heat and pressure in narrow, flat shallow sealed vessels immersed in tanks containing a heated liquid through which the heat can readily penetrate evenly throughout the mass of material without stirring or agitating, substantially as described.

2. The process of converting farinaceous substances into dextrin which consists in treating the material without agitating in narrow flat or sealed vessels immersed in heated liquid, the material being under considerable pressure and at a temperature at or above 212° F., substantially as described.

In testimony whereof I have hereunto set my hand in presence of two subscribing witnesses.

JOSEPH VERITY.

Witnesses:
    J. OWDEN O'BRIEN,
    GEO. I. WATSON.